A. H. PLEASANTS.
COMPUTER FOR PARCEL POST.
APPLICATION FILED FEB. 6, 1913.
1,086,213.
Patented Feb. 3, 1914.
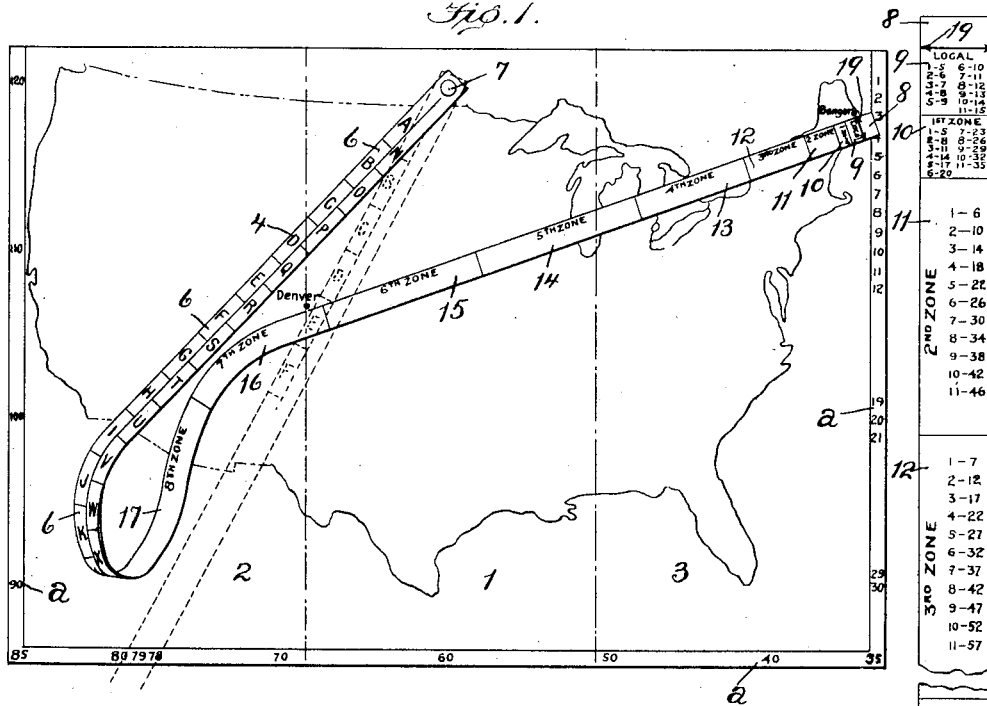
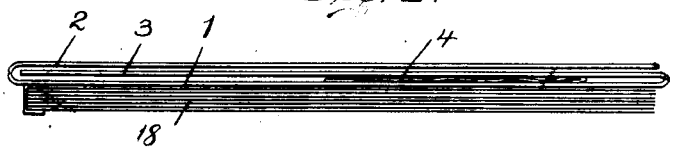
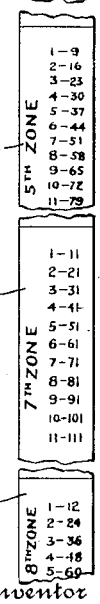
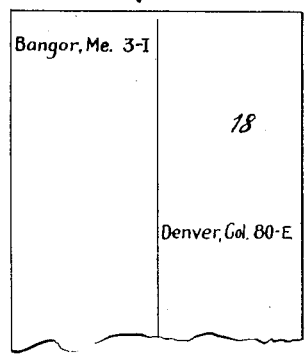
Witnesses
Edwin L. Bradford
G. Ferd. Vogt
Inventor
Arthur H. Pleasants
By
Mann & Co.
Attorneys

UNITED STATES PATENT OFFICE.

ARTHUR H. PLEASANTS, OF BALTIMORE, MARYLAND.

COMPUTER FOR PARCEL POST.

1,086,213.   Specification of Letters Patent.   Patented Feb. 3, 1914.

Application filed February 6, 1913. Serial No. 746,433.

*To all whom it may concern:*

Be it known that I, ARTHUR H. PLEASANTS, a citizen of the United States, residing at Baltimore, in the State of Maryland, have invented certain new and useful Improvements in Computers for Parcel Post, of which the following is a specification.

This invention relates to a parcel post computer and has for its object to provide a device in connection with a map or chart whereby a mailing and a delivery point may be first located on the map or chart; the zone of the delivery point with respect to the mailing point may then be determined and the postage rates for parcels of any known weight within the postal limits will be readily and accurately ascertained.

In carrying out the invention I make use of and combine with the apparatus a list of post-offices with suitable character references by which the location of any of the offices on the list may be precisely located on the map itself after which the apparatus may be manipulated to locate the mailing and delivery offices and the zone and rates be determined.

The accompanying drawing illustrates the invention wherein—

Figure 1, shows a face view of the map with the improved devices attached thereto. Fig. 2, illustrates the same folded. Fig. 3, shows an enlarged detail of the zone and charge determining strip, and Fig. 4 illustrates a portion of one of the alphabetically-arranged post-office guide sheets.

Referring to the drawing the numeral, 1, designates a central plate or board to which are attached the side flaps, 2, and, 3, so the latter may be folded over onto the central board or swung from over the latter thus forming three sections.

The three sections 1, 2 and 3 are provided with a map or chart on which is located the various post-offices or such part of the same as is deemed important.

A row of numerals extends around the marginal edges of the map or chart and is designated, a, in the drawing, which row of numerals for convenience will be termed locating numerals because they are to aid in locating any desired post-office on the map.

On the central section, 1, I provide a flexible finder strip, 4, which latter, in the present instance, is shown as pivotally connected near one end at, 7, to said section so that it may be turned to a straight line from its pivot point to any one of the locating numerals, a, around the margin of the map. This flexible finder strip, 4, has on its longitudinal marginal edges adjacent to its attached end, a series of lettered spaces, 6,—the spaces being lettered in alphabetical order and will hereinafter be termed locating letters or characters. The free end, 8, of the flexible finder strip is provided with a series of longitudinally extending spaces designated 9—10—11—12—13—14—15—16 and 17, which spaces are termed zone spaces.

The space, 9, is called the "local zone" and covers all territory in which the receiving office or the post-office in which the parcel is deposited by a sender will also make delivery of that parcel; the next space, 10, is termed the 1st zone; the next space, 11, the 2nd zone, and the successive spaces, 12, to, 17, inclusive are termed 3rd, 4th, 5th, 6th, 7th and 8th zones respectively. The 8th zone includes every post-office beyond the 7th zone. It is obvious however, that the number of zones may be increased or varied without departing from the spirit of the invention.

Each zone space on the free end of the flexible finder strip is provided with a series of numerals from 1 to 11 in consecutive order, therefore eleven numbers in each zone, and these numerals designate the weights in pounds of parcels that may be carried in the post. Adjacent to each pound-numeral each space also has a numeral which designates the cost in cents for carrying the parcel anywhere in the zone in which the numerals appear. For example, if a parcel weighs one pound or under and is to be delivered in the local zone the numeral opposite 1 in said local zone will be the charge in postage for carrying that parcel. In the present instance the numeral opposite 1 is the local zone in 5, therefore it will be seen that the one pound parcel to be delivered in the local zone will cost 5 cents. If that same 1 pound parcel is to be delivered in the 8th zone it will be seen that the charge will be 12 cents, and in the 5th zone 9 cents. As another example a two pound parcel to be delivered in the 7th zone will cost 21 cents,—the 21 appearing opposite the 2 in the 7th zone.

To facilitate locating the place of destination on the map or chart, the central section, 1, carries a series of sheets, 18,—a portion of one of which is shown in Fig. 4. These sheets contain an alphabetical list of the post-offices and adjacent to the name of each office on the list there appears a numeral and a letter which together form the key for locating the place on the map or chart, which latter is a well-known feature in connection with maps.

In operation, to ascertain the zone in which the delivery is to be made and charge for a parcel, the first thing necessary is to locate the mailing point and then the place of delivery. This can be accomplished by use of the key on the list sheets. As an example, let it be supposed that a parcel of two pounds is to be sent from Bangor, Maine, to Denver, Colorado. By inspecting the list sheets it will be seen that Bangor is located on the map or chart at 3—T and that Denver is located on the map at 80—E. The finder strip, 4, will definitely locate Denver on the map by first swinging the same on its pivot, 7, until its longitudinal edge extends over the numeral, 80, in the marginal row of locating numerals, a, and then casting the eye along the strip to the locating space, E. Having located Denver and retaining its location with the finger or eye, the finder strip will then be swung on pivot, 7, around to, 3, in the row, a, of locating numerals and the eye is then directed to space, T, on the strip and it will be found that Bangor has position at the side of said locating space, T.

Having now located on the map or chart the mailing point Bangor and the delivery point Denver, I take the free end, 8, of the finder strip and lay the dart, 19, on said strip at the beginning of the zone spaces, on the Denver office and then extend said strip across the map or chart so as to cross the location of the Bangor post-office and at once it will be seen that the two post-offices are seven zones distant. Knowing the parcel to be of a weight between 1 and 2 pounds (not over the latter) the exact charge will be ascertained by noting in the 7th zone space, 16, on the flexible strip the numeral opposite the weight numeral, 2, which in the present case is, 21, it will at once be perceived that it will cost 21 cents to send the 2 pounds parcel from Bangor to Denver seven zones distant.

Having thus described my invention what I claim and desire to secure by Letters Patent is:—

In a parcel post computer, the combination with a map or chart on which the various post offices are indicated, of means for assisting the eye in locating any desired post office on said map or chart, said means including a flexible index strip pivotally connected at one end to said map or chart, and provided with an indexed portion, said strip being elongated beyond the indexed portion, such elongation having graduations for indicating parcel post zones whereby the zone of any post office previously located on said map with respect to any other previously located post office may be readily ascertained.

In testimony whereof I affix my signature in presence of two witnesses.

ARTHUR H. PLEASANTS.

Witnesses:
 CHARLES B. MANN, Jr.,
 G. FERD. VOGT.